Patented Feb. 24, 1942

2,273,827

UNITED STATES PATENT OFFICE 2,273,827

MANUFACTURE OF ARTIFICIALLY COLORED GRANULES

Milton R. Beasley, Norwood, Mass., assignor to Bird & Son, inc., East Walpole, Mass., a corporation of Massachusetts No Drawing. Application June 16, 1939, Serial No. 279,448

7 Claims. (Cl. 91—70)

This invention relates to the manufacture of artificially colored granules and has to do with the provision of weather-resistant granules for mineral surfaced roofing having an asphalt-saturated felt base with granules adherent to the asphalt coating on said base.

Heretofore in the manufacture of artificially colored granules, particles of sand, slate, gravel, rock, blast-furnace slag, or burned clay including crushed brick or the like, have been employed as a granule base with a pigmented silicate coating thereon. In many of such prior art granules, however, under certain moisture and temperature conditions when the granules are exposed to the weather, undesirable surface efflorescence or "blooming" takes place due usually to a leaching out of soluble salts from the granule base, coating, or both, and the subsequent deposition of such salts on the exposed surface thereof. Such "blooming" affects not only the appearance, but even more important, the adherence of the granules to the asphalt roofing which affects adversely both its appearance and life. Various efforts have been made to minimize such "blooming" with more or less success, but such efforts have involved additional trouble and expense due to high temperatures required, or to extra steps and/or materials required to reduce or minimize "blooming" with consequent complication and increased cost in the processes employed and in the resultant product.

The herein described invention provides at low cost a highly successful granule which results in the elimination of efflorescence or "blooming" and avoids not only such undesirable discolored appearance on the exposed surface of the granules, but also tends to be firmly bonded by the asphalt to the surface of the roofing so as not to be freed therefrom due to weather exposure.

I have discovered that these desirable features in the method and in the finished granules may be had by applying to a granule base of serpentine rock (hydrated magnesium silicate of approximate chemical formula 3MgO.2SiO$_2$.2H$_2$O) a silicate of soda coating, clear or pigmented as may be desired, and upon firing the same, have found that the sodium silicate applied reacts with the serpentine to form an insoluble coating or glaze made up of complex silicates which render the product free from "bloom" and provide a firmly adherent ornamental coating which bonds to an asphaltic base. Though I am not absolutely certain, the chemical reactions, which, it is believed, take place in the application of sodium silicate to the serpentine base granules whereby there is formed a complex sodium-magnesium silicate exterior coating, are as follows:

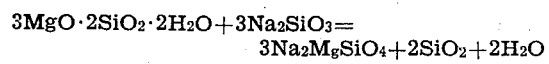

Serpentine itself is sufficiently weather-resistant and hard as to withstand both the manufacturing operations and weathering when coated as described herein, despite the fact that such coating is not absolutely continuous so as to wholly prevent the access of weather to the granule base. It has a specific gravity of approximately 2.4 to 2.65 and a hardness of the order of 3.5 to 5.00. A preferred form of serpentine employed in the practice of this invention is known commercially as asbestos tailings and has a specific gravity within the above range and a hardness of about 4.0 to 4.5. Proportions which have been found entirely suitable in the preferred practice of the invention are as follows:

| | Parts by weight |
|---|---|
| Serpentine granules (asbestos tailings) | 2000 |
| Silicate of soda "N" (approximately 41° Bé.) | 60 |
| Coloring pigment (e. g. chrome oxide) | 16 |

In the practice of the process the serpentine granules may be dry mixed with the pigment and the liquid silicate of soda then added and the mixing continued, or the serpentine granules may be mixed with the liquid silicate of soda to which any suitable coloring material may be added. If desired, however, the process may be practiced without the use of pigment so that the base is supplied with a hard substantially clear, colorless coating. The granules thus coated are first dried and then run through a kiln, or are run directly through a kiln wherein they are heated to a temperature of from 450° F. to 1200° F. (preferably 900° F. to 1100° F.), which both accelerates the chemical reaction between the serpentine base and silicate of soda with the result that the granules on their exterior surface are thus provided with the desired hard and colored coating. It is found in practice that the proportions of granules, pigment and silicate of soda are not at all critical. The temperatures above given are found in practice to be entirely successful, though normally the temperature is carried to 1000° F. or thereabouts in order to secure the best results. Though in the ordinary practice of this invention only sodium silicate is employed, it is contemplated that a chemically equivalent silicate such as potassium silicate may be substituted therefor, and accordingly, come within the scope of the appended claims.

Having described my invention, I claim:

1. The method of making colored granules which consists in first providing serpentine granular base material, then applying to the granules a liquid coating of sodium silicate, and finally heating said granules thus coated to a temperature sufficiently high to react said coating in situ with the serpentine base material and produce on said granules a hard insoluble exterior coating.

2. The method of making colored granules which consists in first providing serpentine granular base material, then applying to the granules a liquid coating of sodium silicate having therein a coloring pigment, and finally heating said granules thus coated to a temperature sufficiently high to react said coating in situ with the serpentine base material and produce on said granules a hard insoluble colored exterior coating.

3. The method of making colored granules which consists in first providing serpentine granular base material, then applying to the granules a liquid coating of sodium silicate having therein a coloring pigment, and finally heating said granules thus coated to a temperature between 450° and 1200° F. to react said coating in situ with the serpentine base material and produce on said granules a hard insoluble colored exterior coating.

4. The method of making colored granules which consists in first providing serpentine granular base material, then applying to the granules a liquid coating of sodium silicate having therein a coloring pigment, and finally heating said granules thus coated to a temperature between 450° and 1000° F. to react said coating in situ with the serpentine base material and produce on said granules a hard insoluble colored exterior coating.

5. As a new article of manufacture, roofing granules of the class described consisting of a serpentine base and having on the exterior thereof a hard, substantially non-blooming, insoluble coating, said coating comprising substantially the reaction product of sodium silicate and serpentine and being weather-resistant and substantially free from discoloring water-soluble salts.

6. As a new article of manufacture, roofing granules of the class described consisting of a serpentine base and having on the exterior thereof a hard, substantially non-blooming, insoluble colored coating, said coating consisting substantially of pigment and the reaction product of sodium silicate and serpentine and being weather-resistant and substantially free from discoloring water-soluble salts.

7. As a new article of manufacture, roofing granules of the class described consisting of a serpentine base of asbestos tailings and having on the exterior thereof a hard, substantially non-blooming, insoluble colored coating, said coating consisting substantially of pigment and the reaction product of sodium silicate and serpentine and being weather-resistant and substantially free from discoloring water-soluble salts of sodium.

MILTON R. BEASLEY.